US008837342B2

United States Patent
Berenberg

(10) Patent No.: US 8,837,342 B2
(45) Date of Patent: *Sep. 16, 2014

(54) LOW POWER WIRELESS NETWORK FOR AD-HOC APPLICATIONS

(71) Applicant: Cubic Corporation, San Diego, CA (US)

(72) Inventor: Paul Berenberg, Mountain View, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/789,351

(22) Filed: Mar. 7, 2013

(65) Prior Publication Data

US 2013/0294305 A1    Nov. 7, 2013

Related U.S. Application Data

(63) Continuation of application No. 13/096,127, filed on Apr. 28, 2011, now Pat. No. 8,416,726.

(51) Int. Cl.
*G08C 17/00* (2006.01)
*H04W 52/02* (2009.01)
*H04L 12/26* (2006.01)

(52) U.S. Cl.
CPC ............ *H04W 52/0225* (2013.01); *Y02B 60/50* (2013.01); *H04W 52/0241* (2013.01)
USPC .......................................... 370/311; 370/242

(58) Field of Classification Search
None
See application file for complete search history.

(56) References Cited

U.S. PATENT DOCUMENTS

| | | | |
|---|---|---|---|
| 2004/0042434 A1 | 3/2004 | Kennedy | |
| 2005/0261037 A1 | 11/2005 | Raghunath et al. | |
| 2006/0149980 A1* | 7/2006 | Zhong | 713/320 |
| 2007/0080800 A1 | 4/2007 | Carbone et al. | |
| 2008/0181154 A1 | 7/2008 | Sherman | |
| 2009/0059827 A1* | 3/2009 | Liu et al. | 370/311 |
| 2010/0283575 A1 | 11/2010 | Tubb et al. | |
| 2010/0329232 A1* | 12/2010 | Tubb et al. | 370/345 |
| 2012/0203918 A1 | 8/2012 | Berenberg et al. | |

FOREIGN PATENT DOCUMENTS

| | | |
|---|---|---|
| KR | 10-2005-0104393 A | 11/2005 |
| KR | 10-2010-0112869 A | 10/2010 |

OTHER PUBLICATIONS

Author Unknown, Dust Networks, "SmartMesh Technology Overview", Dec. 2, 2010. Web. Retrieved from http://webarchive.org/web/*/http://www.dustnetworks.com/technology on Apr. 2, 2014, 4 pages.

(Continued)

*Primary Examiner* — Clemence Han
(74) *Attorney, Agent, or Firm* — Kilpatrick Townsend & Stockton LLP

(57) ABSTRACT

Techniques are disclosed for reducing power of network devices in a low-power wireless network. Embodiments generally include, for a network device that periodically toggles between high-power and low-power modes, increasing the relative amount of time the network device operates in a low-power mode under certain conditions that may otherwise cause the network device to consume more power. Such conditions include when the network device fails to join the low-power wireless network and/or when the network device fails to communicate with the low-power wireless network with an accuracy above a certain threshold level.

20 Claims, 14 Drawing Sheets

(56) References Cited

OTHER PUBLICATIONS

Polastre, Joseph et al., "A unifying link abstraction for wireless sensor networks", Proceedings of the 3.sup.rd International Conference on Embedded Networked Sensor Systems: ACM NY pp. 76-89, Nov. 2-4, 2005.

Zheng, Jianliang et al., A comprehensive performance study of IEEE 802.15.4, pp. 1-14.

International Search Report and Written Opinion dated Apr. 16, 2012 for International Application No. PCT/US2011/034454, 6 pages.

International Search Report and Written Opinion dated Feb. 23, 2012 for International PCT Application No. PCT/US2011/034436, 9 pages.

\* cited by examiner

LOW POWER WIRELESS NETWORK FOR AD-HOC APPLICATIONS

The present application is a continuation of U.S. Non-Provisional application Ser. No. 13/096,127, filed on Apr. 28, 2011, of which the entire disclosure is incorporated herein by reference for all purposes.

STATEMENT AS TO RIGHTS TO INVENTIONS MADE UNDER FEDERALLY SPONSORED RESEARCH AND DEVELOPMENT

The U.S. Government may have rights in this invention pursuant to Contract No. 1406-04-06-CT-60916.

BACKGROUND OF THE INVENTION

Modern networks can comprise a variety of devices, which may be connected in a variety of ways. A network can be, for example, centralized or ad hoc. In the latter case, each networked device, or node, can act as a router to forward data from other nodes, in addition to communicating its own data.

These wireless networks, however, have their limitations. For example, wireless devices powered by batteries may require frequent battery changes due to the high power cost of wireless data transmission. Because of maintenance issues, among other things, ad hoc wireless networks have may not be used in various applications for which the networks might otherwise be suitable.

BRIEF SUMMARY OF THE INVENTION

Techniques are disclosed for reducing power of network devices in a low-power wireless network. Embodiments generally include, for a network device that periodically toggles between high-power and low-power modes, increasing the relative amount of time the network device operates in a low-power mode under certain conditions that may otherwise cause the network device to consume more power. Such conditions include when the network device fails to join the low-power wireless network and/or when the network device fails to communicate with the low-power wireless network with an accuracy above a certain threshold level.

An example of a network device for communicating with a low-power wireless network, according to the disclosure, includes a battery, a wireless interface, and a processing unit coupled with the battery and the wireless interface. The processing unit can be configured to cause the network device to periodically switch between operating in a first mode and operating in a second mode. The network device can use less power while operating in the second mode than while operating in the first mode. The processing unit also can be configured to cause the network device to detect, using the wireless interface, a packet of information from the low-power wireless network. The detection can occur while the network device is operating in the first mode. The processing unit also can be configured to cause the network device to operate in a second mode for a certain amount of time. The certain amount of time can be based, at least in part, on information of the packet of information. The processing unit also can be configured to cause the network device to send data toward the low-power wireless network and determine that a condition has occurred with respect to the sending of the data. Finally, the processing unit also can be configured to cause the network device to increase the time in which the network device operates in the second mode. The increase can be based, at least in part, on the determination that the condition has occurred.

The example network device can include one or more of the following features. The condition can include either or both of a failure of the network device to join the low-power wireless network, and a failure of the network device to communicate the data to the low-power wireless network with an accuracy above a threshold level. Increasing the time in which the network device operates in the second mode can include reducing a length of one or more time periods in which the network device operates in the first mode. Reducing a number of radio frequency (RF) channels scanned during each of the one or more time periods in which the network device operates in the first mode. Increasing the time in which the network device operates in the second mode can include increasing a length of each time period in a set of time periods in which the network device operates in the second mode. The length of each time period in the set of time periods can be successively reduced. The time in which the network device operates in the second mode can be increased by operating in the second mode during one or more time periods in which the network device would otherwise operate in the first mode. At least one sensor can be communicatively coupled with the processing unit. The processing unit can be further configured to cause the network device to include a request to join the low-power network in the data the network device is configured to send toward the low-power network. The processing unit can be configured to determine that the condition has occurred using at least one factor selected from the group of factors consisting of a failure of an error control check, receipt of a packet of information indicating the network device has not joined the low-power wireless network, an inability of the network device to decrypt a packet, an inability of the network device to authenticate a packet, and a failure to receive a packet of information from the low-power wireless network.

An example method of communication in a low-power wireless network, according to the disclosure, includes detecting, with a wireless device, a packet of information from the low-power wireless network. The detection can occur while the network device is operating in a first mode. The method can also include operating the network device in a second mode for a certain amount of time, where the network device uses less power while operating in the second mode than while operating in the first mode, and the certain amount of time is based, at least in part, on information of the packet of information. The method further can include sending data toward the low-power wireless network, determining that a condition has occurred has occurred with respect to the sending of the data, and increasing the time in which the network device operates in the second mode. The increase can be based, at least in part, on the determination that the condition has occurred.

The example method can include one or more of the following features. The condition can include either or both of a failure of the network device to join the low-power wireless network, and a failure of the network device to communicate the data with the low-power wireless network with an accuracy above a threshold level. Increasing the time in which the network device operates in the second mode can include reducing a length of one or more time periods in which the network device operates in the first mode. A number of radio frequency (RF) channels scanned during each of the one or more time periods in which the network device operates in the first mode can be reduced. Increasing the time in which the network device operates in the second mode can include increasing a length of each time period in a set of time periods in which the network device operates in the second mode. The length of each time period in the set of time periods can be successively reduced. Increasing the time in which the network device operates in the second mode can include operating the network device in the second mode during one or more time periods in which the network device would otherwise operate in the first mode. A request to join the low-power network can be included in the data sent toward the low-power network. It can be determined that the condition has occurred using at least one factor selected from the group of factors consisting of a failure of an error control check, receipt of a packet of information indicating the network device has not joined the low-power wireless network, an inability of the network device to decrypt a packet, an inability of the network device to authenticate a packet, and a failure to receive a packet of information from the low-power wireless network.

Another example network device configured to wirelessly communicate with a network, according to the disclosure, includes a wireless interface, a power source, and a processing unit coupled with the radio and the power source. The processor can be configured to cause the network device to periodically power on the wireless interface, send data toward the network and determine a condition has occurred with respect to sending the data toward the network. The condition can include either or both of a failure of the network device to join the network and a failure of the network device to communicate the data to the network with an accuracy above a threshold level. Finally, the processor can be configured to cause the network device to reduce, for a certain period of time after the determining the condition has occurred, an amount of time the wireless interface is powered on.

DETAILED DESCRIPTION OF THE INVENTION

Figure 1A:
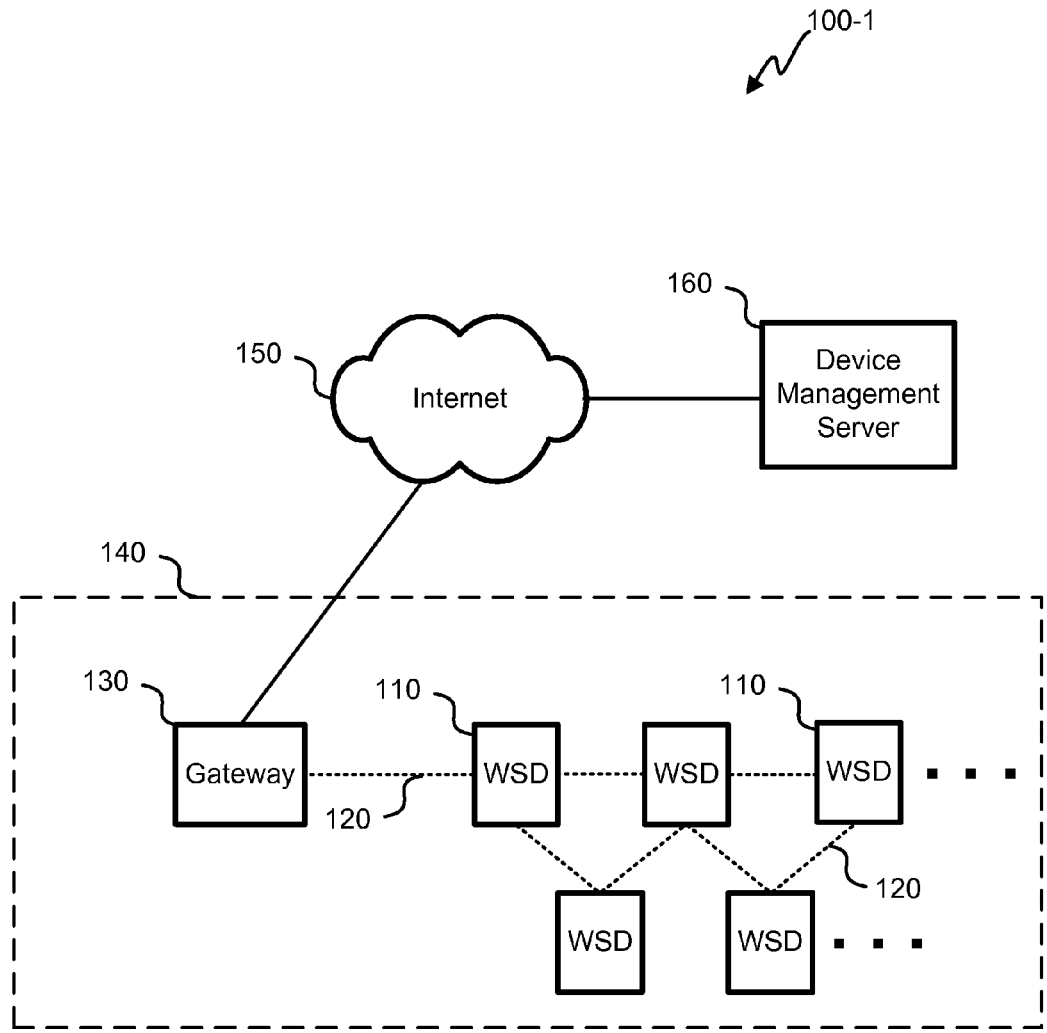
FIG. 1A is a block diagram of an embodiment of a wireless network for communicating sensor information.

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Wireless networks and wireless network devices (including wireless sensor devices (WSDs)) described herein may be configured in a variety of ways, in a variety of contexts. Example configurations include mesh, point-to-point, and/or ad hoc networks, among others. The flexible nature of these networks—enabling network devices, or nodes, to join and leave these networks dynamically—together with WSDs configured to collect and communicate sensor information, enables these networks to provide end-to-end security and management of transportation and/or logistical systems. Although disclosed embodiments focus on wireless technologies, the techniques described herein can be applied to wired communication networks, such as an ad-hoc serial interface, for example.

For example, a wireless network can comprise a plurality of WSDs providing sensor information relating to a plurality of cargo containers located in a depot. The sensor information can include data from a variety of sensors, which can indicate the temperature and/or humidity of a container, whether the container door is or has been opened, whether the container is experiencing or has experienced a shock, the location of the container, whether the container is moving, and more. The wireless network further can include a gateway device that collects the sensor information and provides it to systems outside the wireless network. As WSD-equipped containers enter and leave the depot, the wireless network will adjust accordingly, enabling WSDs of containers entering the depot to join the wireless network while the WSDs of containers leaving the depot are dropped from the wireless network. Furthermore, WSDs can act as routers to relay sensor information from other WSDs that are not in direct communication with the depot's gateway device.

Low-power wireless networks can be advantageous in transportation, logistical, and similar applications where network devices are mobile devices operating on battery power. Although many battery-operated mobile devices utilize wireless technologies, most mobile devices exhaust their batteries in a matter of hours or days. The term "low-power wireless networks" as used herein refers to wireless networks utilizing technologies that enable battery-powered devices to operate for a year or more without exhausting their batteries. This can include technologies associated with the IEEE 802.15.4 and/or ISO/IEC 18000-7 standards, as well as various proprietary technologies, among others.

FIG. 1A is a block diagram of an embodiment of a logistical management system 100-1. In this embodiment, a plurality of WSDs 110 are networked together to generate and communicate sensor data. A WSD 110 gathering sensor information can communicate the sensor information toward a gateway 130 using a wireless connection 120. If there are one or more WSDs 110 communicatively linked between the WSD 110 originating the sensor information and the gateway 130, the one or more WSDs 110 will relay the sensor information until it reaches the gateway 130. The logistical management system 100-1 depicted in FIG. 1A is shown as an example and is not limiting. The sensor network 140 can be configured in a variety of ways. For instance, the gateway 130 can connect with multiple WSDs 110, and WSDs 110 can have more or fewer wireless connections 120 than indicated in FIG. 1A. Moreover, multiple gateways 130 and/or sensor networks 140 may be included in a logistical management system 100.

The gateway 130 provides connectivity between sensor network 140—comprising the gateway 130 and WSDs 110—and a device management server (DMS) 160. Communication between the gateway 130 and the DMS 160 can be relayed through the Internet 150, or any other Wide Area Network (WAN). Additionally or alternatively, other networks, such as Local Area Networks (LANs), can be used. Other configurations can include a gateway 130 communicating directly with the DMS 160 without a separate network.

The DMS 160 provides an interface between the sensor network 140 that can be used by a human user or another system, by utilizing, for example, a graphical user interface (GUI) and/or an application programmable interface (API). The DMS 160 can collect and store information from the WSDs 110. The data communicated between the DMS 160 and the gateway 130 can be securely communicated in encrypted packets, and the DMS 160 can provide secure management of the collected data.

One or more of a variety of physical layers may be used to provide the wireless connections 120 of the sensor network 140. According to one embodiment, the WSDs 110 and gateway 130 communicate using a protocol stack based on IEEE 802.15.4 standard at 2.4 GHz using all 16 channels available in that standard. This physical layer enables the sensor network 140 to operate using very low power and/or predictable power consumption—which can be an important consideration for embodiments in which the WSDs 110 and/or gateway 130 operate on battery power. Nonetheless, other wireless technologies may be used, including IEEE 802.15.4 at 900 MHz; IEEE 802.11; Bluetooth®; IEEE 802.16; Ultra Wideband (UWB); 433 MHz Industrial, Scientific, and Medical (ISM) Band; cellular; optical; and more, using multiple RF channels (e.g., narrow-band frequency hopping) or a single RF channel. The gateway 130 can communicate with the Internet 150 through a wired connection and/or a wireless connection, as shown in FIG. 1B.

Figure 1B:
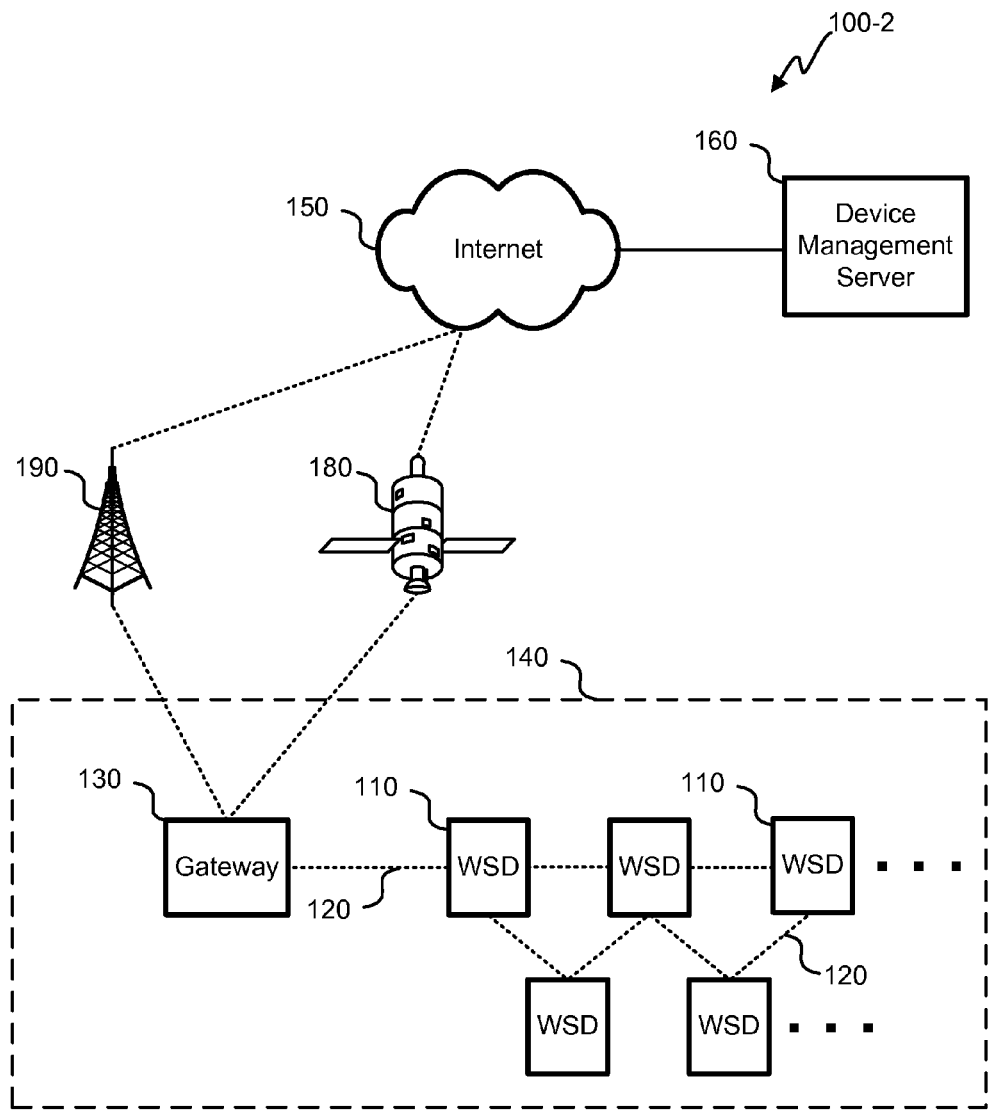
FIG. 1B is a block diagram of another embodiment of a wireless network for communicating sensor information, in which a gateway device is wirelessly connected with the Internet.

FIG. 1B is a block diagram of an alternative embodiment of a logistical management system 100-2. In this embodiment, the gateway 130 can communicate with the Internet 150 wirelessly, through wireless communications with a satellite 180 and/or a cellular tower 190. The user of such a wireless interface between the gateway 130 and the internet 150 can be a factor of available internet connectivity and desired mobility of the sensor network 140, among other considerations.

Figure 2:
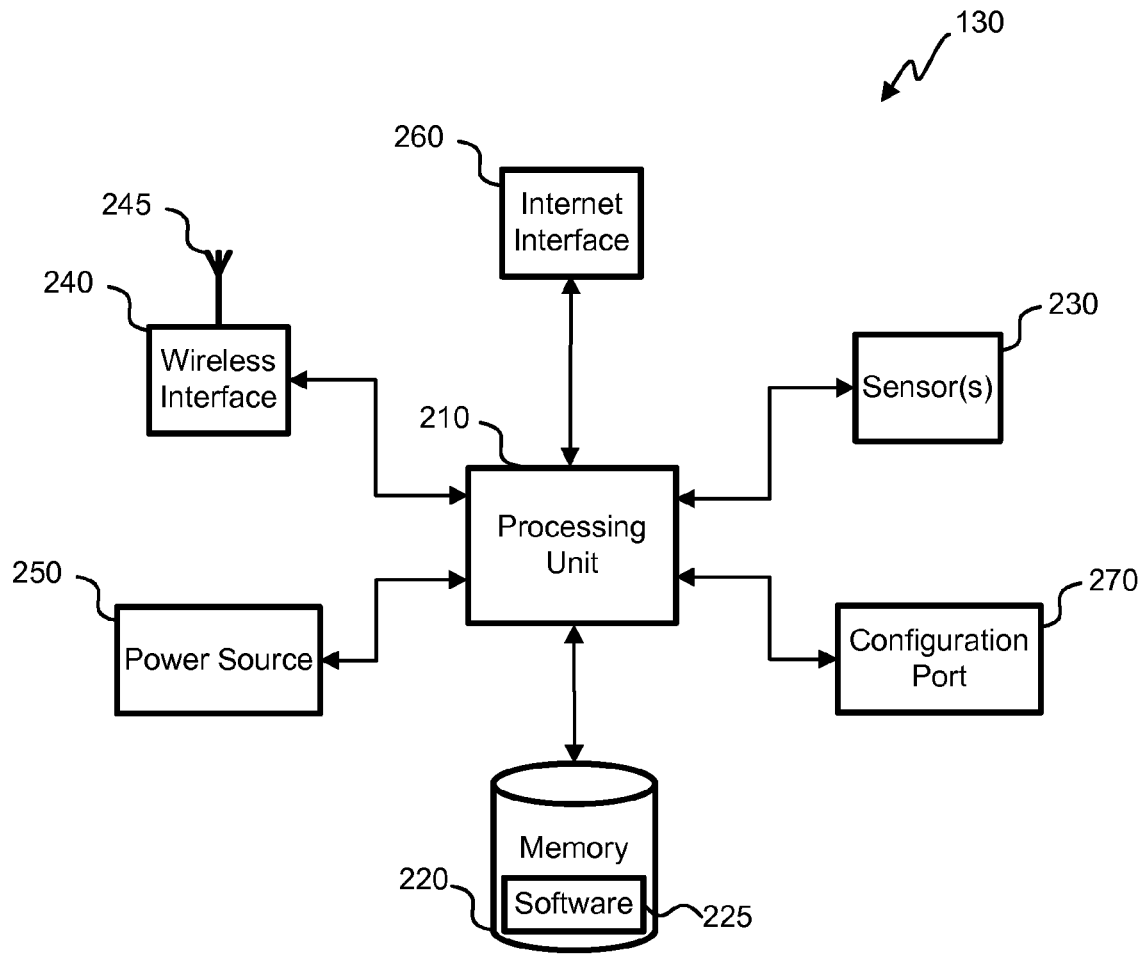
FIG. 2 is a block diagram of an embodiment of a gateway device.

FIG. 2 is a block diagram of an embodiment of a gateway device 130. This block diagram, as with other figures shown herein, is provided as an example only, and is not limiting. The gateway device 130 can be configured in alternate ways by, for example, including a global positioning system (GPS) unit and/or other components not shown in FIG. 2.

A processing unit 210 lies and the heart of the gateway device 130. The processing unit 210 can be comprised of one or more processors, microprocessors, and/or specialized integrated circuits. The processing unit 210 can gather information from the other components of the gateway device 130 and process the information in accordance with software 225 disposed in memory 220. Depending on desired functionality of the gateway device 130 and the capabilities of the processing unit 210, the software 225 can include an operating system with one or more executable programs. Alternatively, the software can include lower-level instructions, such as firmware and/or microcode, for the processing unit 210 to execute.

The power source 250 supplies power to the components of the gateway device 130 and may provide additional information (e.g., battery charge, voltage levels, etc.) to the processing unit 210. For a mobile gateway device 130, the power source 250 can comprise one or more batteries. For a fixed gateway device 130, the power source can include a power converter, transformer, and/or voltage regulator.

The wireless interface 240 provides communication with WSDs 110. As indicated above, this communication can be effectuated using any of a variety of technologies, including radio frequency (RF) and/or optical communication technologies. Where RF technologies are used, the wireless interface can include an antenna 245.

The gateway device 130 can also include a configuration port 270, which can allow a device, such as a computer, to be connected to the gateway device 130 for the purposes of configuring the gateway device 130. The configuration port 270 can comprise universal serial bus (USB) connector, serial port, optical, or other connector to input information from an external device. Depending on the functionality of the gateway device 130 and/or WSDs 110, the configuration port 270 may be used to configure device information and reporting, sensor parameters, software, security, network parameters, power consumption, GPS parameters, file management, and more.

The Internet interface 260 can be any of a variety of interfaces, depending on desired functionality. As indicated in FIG. 1A, the gateway device 130 can have a wired connection with the Internet, in which case the Internet interface 260 can include an Ethernet or other wired interface. Additionally or alternatively, the gateway device 130 can have a wireless connection with the Internet, as indicated in FIG. 1B. In this case, the Internet interface can comprise one or more wireless radios, such as a dual-mode WAN radio enabling cellular and satellite communication.

The gateway device 130 further can include sensor(s) 230, enabling the gateway device to collect sensor information similar to the WSDs. This sensor information can include information relating to temperature, humidity, motion, light, battery charge, shock, and application-specific information (e.g. the state of a door—open or closed—on a cargo container). Depending on desired functionality, the processing unit 210 may collect, process, and/or record the sensor information, or the processing unit 210 simply may send unprocessed sensor information to the DMS 160 using the Internet interface 260.

Figure 3:
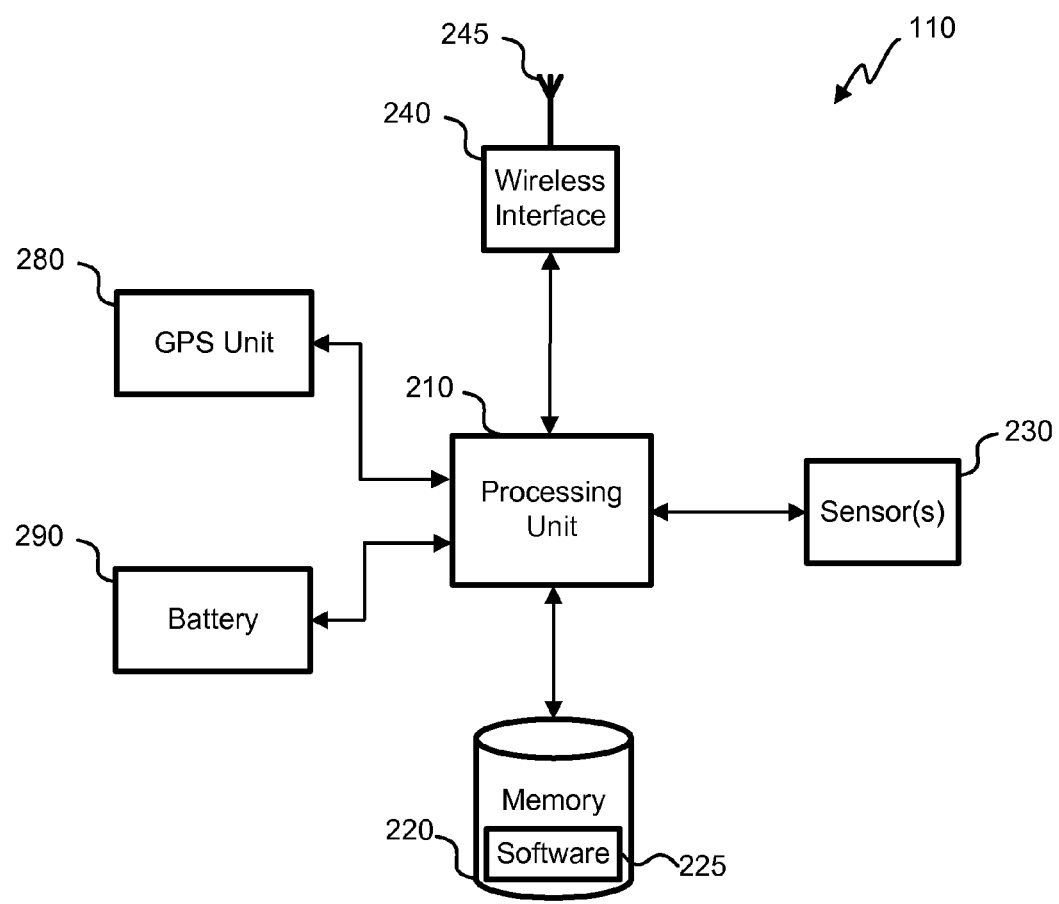
FIG. 3 is a block diagram of an embodiment of a wireless sensor device (WSD).

FIG. 3 is a block diagram of an embodiment of a WSD 110. This embodiment includes many components—such as the sensor(s) 230, processing unit 210, memory 220, and wireless interface 240—that are similar to the gateway device 130. Here, however, the components may be simpler than corresponding components of the gateway device 130, due to power and functionality considerations. For example, the processing unit 210 can comprise a microprocessor and the memory 220 and software 225 can comprise programmed logic of the microprocessor. It can also be noted that the WSD 110 and/or the gateway device can include an interface (not shown) to provide a user with information. Such an interface can comprise a liquid-crystal display (LCD), one or more light emitting diodes (LEDs), etc.

WSD 110 further includes a battery 290. Because the wireless network can provide lower-power consumption, a battery having a long shelf life—such as an alkaline-, silver-oxide-, or lithium-based battery—can provide for operability of the WSD 110 without the need to change batteries for several years. According to one embodiment, a WSD 110 uses up to 4 A-size 3.6 volt (V) batteries, each battery rated at approximately 3600 milliamp hours (mAh). Some embodiments of the WSD 110 have an operating power of under 2 milliwatts (mW); other embodiments of the WSD operate under 1 mW. Therefore, depending on the battery's shelf life and capacity, as well as the configuration of the WSD 110, the WSD 110 can operate for 10 years or more without the need to change the battery.

The WSD 110 can also include a GPS unit 280 to provide location information. Location information can be particularly useful where a sensor network 140 is spread over a large physical area. Moreover, the GPS unit 280 further can be used to sense motion of the WSD 110 by determining, by the GPS unit 280 and/or the processing unit 210 a change in location over time.

Figure 4:
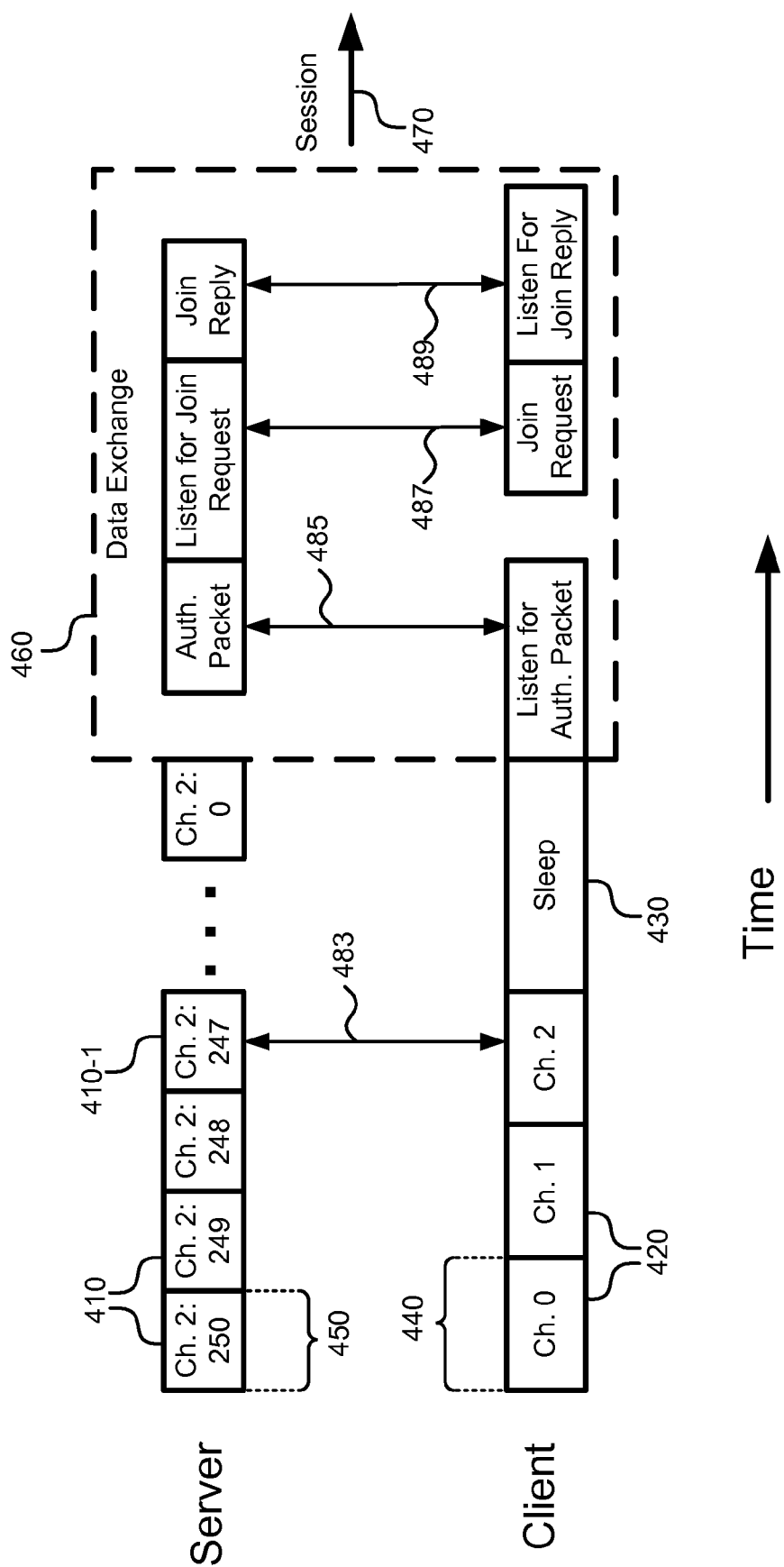
FIG. 4 is a diagram illustrating the timeline of a joining sequence between a client node and a server node, according to one embodiment.

FIG. 4 is a is a diagram illustrating the timeline of a joining sequence between a client and a server that provides for low power consumption by both client and server, according to one embodiment. Here, the server can be a WSD 110 or gateway 130 currently joined with a sensor network 140 (or other wireless network), and the client can be a WSD 110 not joined with the sensor network 140, but is attempting to join the sensor network 140. WSDs 110 therefore can act as both servers and clients, depending on their relationship with the sensor network 140 and other WSDs 110.

A client not joined to a sensor network 140 can initiate a scanning sequence, including one or more scans 420, to detect beacons 410 (e.g., packets of information for detecting and/or joining a network) sent by a server joined with the sensor network 140. To increase the likelihood of detecting a beacon 410, the client can execute the scanning sequence periodically for a certain period of time. For clients enabled to communicate over multiple frequency channels, the scanning sequence can include scans 420 of multiple channels. Depending on the functionality of the client, a scanning sequence that scans multiple channels may be conducted by conducting a scan 420 of each channel in sequence. For example, the scans 420 of the client shown in FIG. 4 begin with channel 0 and increase in channel number for each successive scan 420.

A server joined to the sensor network 140, meanwhile, can initiate a beaconing sequence to allow potential clients to join the sensor network 140. The beaconing sequence can comprise a series of beacons 410, which can be numbered to enable the client to determine the end of the beaconing sequence. Each beacon 410 in the beaconing sequence shown in FIG. 4, for example, includes a number of a countdown sequence that indicates the end of the beaconing sequence when the countdown reaches 0. With this information, the client can stop scanning and enter a sleep mode until the beaconing sequence has ended, to reduce power usage and increase battery life.

For example, in the diagram of FIG. 4, the server initiates a beaconing sequence on channel 2. When the client scans channel 2, it captures a beacon 410-1 at point 483. The client determines the beacon 410-1 has the number 247, and therefore client turns off its wireless interface 240 (e.g., radio) and enters a sleep period 430 in which the client operates in a low-power sleep mode. This enables the client to conserve power while the server continues to send out the remaining 247 beacons 410 of the beaconing sequence.

In order to capture complete beacon information from a server, the scanning period 440 can be as long or longer than the corresponding beacon period 450. If only part of the beacon 410 is received by the client, and where the server is configured to send multiple beacons 410, the client can extend the scanning period 440 to receive the next beacon 410. Additionally or alternatively to the configuration in which the client scans multiple channels and the server beacons on one channel, the server can beacon over multiple channels while the client scans a single channel.

At the end of the sleep period 430, the client can once again power on its wireless interface 240 and enter a data exchange 460 in which data is communicated between server and client. For a client, the data exchange 460 can include capturing an authentication packet, shown at point 485. For a server, the data exchange 460 can include capturing a join request from the client, shown at point 487, and sending a join reply, shown at point 489. This data exchange 460 can be followed by a session 470 in which the client and server exchange additional information, such as determine a schedule for periodic communication. Such scheduling information is discussed in greater detail in U.S. patent application Ser. No. 13/023,623, entitled "Lower Power Wireless Network For Transportation And Logistics," which is incorporated herein in its entirety. By trying to maintain a fixed time for the data exchange 460, the server can maintain a predictable low-power profile. In addition or as an alternative to these techniques, Carrier Sense Multiple Access with Collision Avoidance (CSMA-CA) and/or CSMA with Collision Detection (CSMA-CD) techniques can be used.

Figure 5:
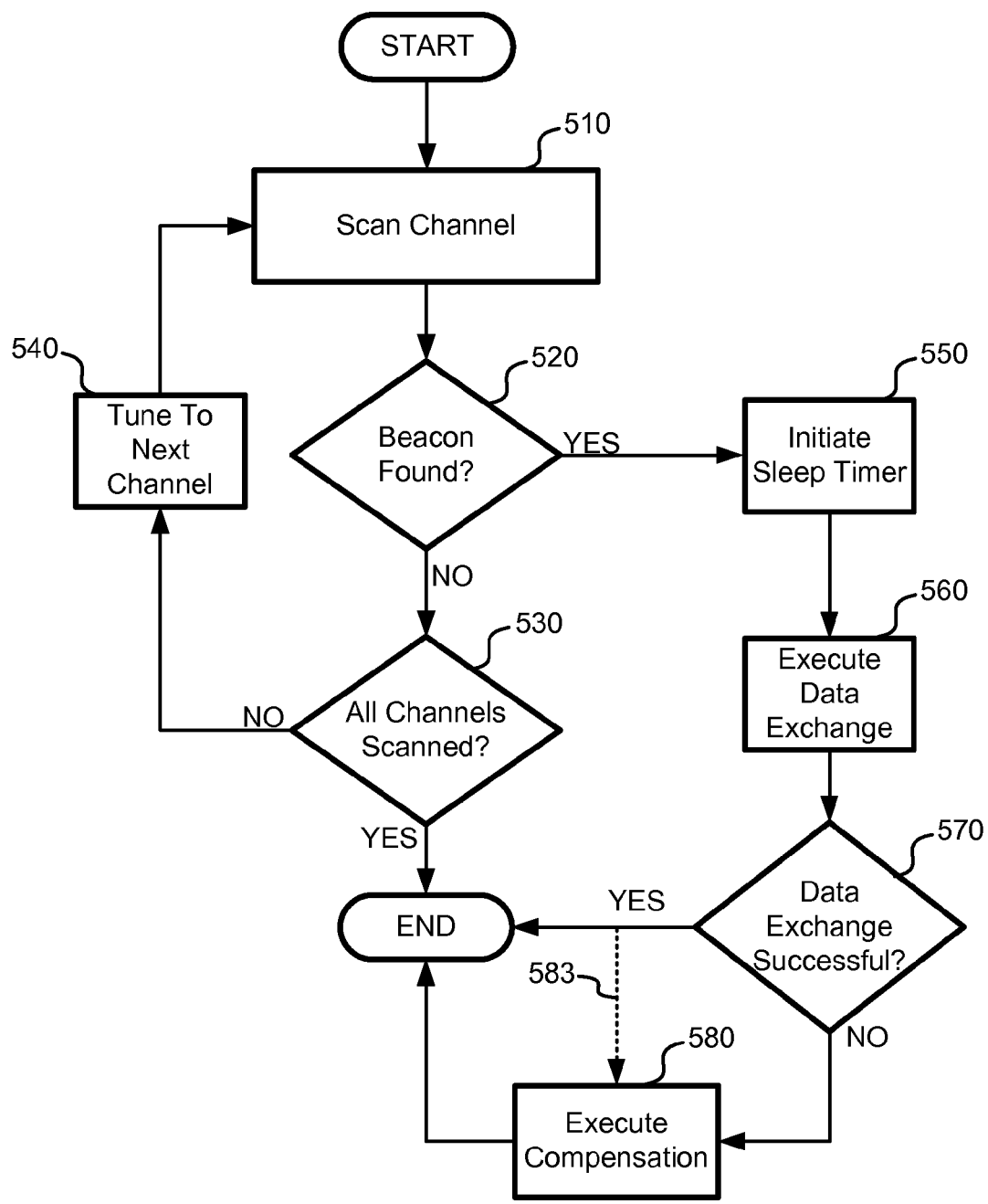
FIG. 5 is a flow diagram of an embodiment of a method for executing power compensation in a joining sequence of a client node.

FIG. 5 is a flow diagram illustrating a process that can be executed by a client with respect to scanning for and joining with a sensor network 140, according to one embodiment. As with other diagrams provided herein this process is an example and is not limiting. For example, blocks may be added, combined, separated, etc. Moreover, the power compensation discussed is not limited to joining sequences and can be applied to virtually any communication between a server and client.

The process can start with a scanning sequence in which, at block 510, the client scans a channel. At block 520, the client can determine whether a beacon 410 was detected. If a beacon 410 was not detected, then, at block 530, the client can determine whether all channels were scanned. If all channels were scanned, the scanning sequence is completed, and the process will end. Alternatively, if one or more additional channels need to be scanned, then the client can tune to the next channel, at block 540, and execute the next scan, at block 510.

If a beacon 410 is detected during a scan, then the client can initiate a sleep timer, at block 550, in which the client enters a sleep mode. As indicated above, the duration of the sleep mode can be based information contained in the beacon 410, such as a number. After awaking from the sleep mode, the client can enter in a data exchange 460 with a server, at block 560.

At block 570, the client determines whether the data exchange 460 was successful. Whether or not the data exchange 460 was successful can be determined using certain conditions. One condition, for example, is whether the client was able to join the sensor network 140. Such a failure to join the sensor network can be due one or more of various factors, such as radio frequency (RF) interference (including interference, or "contention," from other clients that may be attempting to join the sensor network 140 at the same time), mismatch of the network ID and/or mask between the server and client, a failure to authenticate and/or decrypt packet information, a decision by the client and/or server that a routing cost is above an allowable threshold, the client is already joined, the client is on a black list and/or not on a white list, a message size is incorrect, an error in timing, an error in message type, and even an error in the software, firmware, and/or hardware. Another condition that can indicate whether the data exchange 460 was successful is whether the client is able to communicate with the sensor network 140 with an accuracy above a threshold level. This can be determined using measures such as a cyclic redundancy check (CRC) and/or other error-detecting codes to ensure the integrity of the data communication between server and client. If the data exchange 460 is determined to be successful, the process can end. Optionally, as indicated by arrow 583, compensation (as discussed in further detail below) can be executed after successful data exchange 460.

If it is determined that the data exchange 460 was unsuccessful, the client can, at block 580, execute "compensation," or remedial measures designed to "compensate" for the increased power used during the failed data exchange 460. Such compensation can help ensure at least a minimal battery life for the server and/or the client by helping reduce prolonged periods of relatively high power consumption. Moreover, compensation often involves powering down the client's wireless interface 240 and reducing RF communication, which can reduce RF interference among nodes and prospective notes of the sensor network 140.

Compensation can be executed in any of a variety of ways. As indicated above, a client can periodically execute scanning sequences, which can be executed at certain intervals to increase the likelihood that a beacon 410 from a server will be detected. These scanning sequences occur while the client is in a scanning mode, with the wireless interface 240 powered on, thereby consuming more power than when the client is in a sleep mode (with all or a portion of the wireless interface 240 powered off). Therefore, one form of compensation can simply be to omit one or more scanning sequences that would otherwise occur, entering into a sleep mode (or other low-power mode) rather than the scan mode. For example, if the client is configured to execute a scanning sequence, the client can execute compensation by skipping the next 10 scheduled scanning sequences. Additionally or alternatively, the client can omit any scheduled scans 420 within a certain time frame, or "compensation period" (e.g., omit any scans in the next 25 seconds, where the 25 seconds is the compensation period).

Another form of compensation can be to reduce the length of the clients scanning sequences within a compensation period. For example, the client can determine that, for the next minute, scanning sequences will last half as long. One way to do so can be to reduce the number of scans 420 within the time frame. For a client that scans multiple channels, this could entail scanning only certain channels (e.g., high-use channels) during the time frame. Alternatively, the client could scan different subsets of channels for each scanning sequence during the time frame.

The amount of the reduction in length of the scanning sequences during a compensation period can vary. For example, the client can reduce the length of a scanning sequence to one half the length of a normal scanning sequence, then gradually increase the length of each subsequent scanning period until the length of the scanning sequences reach full length. Depending on desired functionality and/or other considerations, other configurations can reduce the length of the initial scanning sequence in the compensation period to more than half the length of a normal scanning sequence or less than half the length of a normal scanning sequence.

Another form of compensation, related to those discussed above, can be to increase intervals between scanning sequences during a compensation period by increasing, for example, the length of time the client is in a sleep mode. For instance, if a client typically executes a scanning sequence every 2.5 seconds, the client may have a compensation period in which intervals between scanning sequences are increased to 5 seconds.

Alternatively, the client may vary the length of intervals between scanning sequences in a compensation period. One such technique would be to increase the initial interval of time between scanning sequences, then successively reduce each interval. For example, a sequence of intervals between scanning sequences in a compensation period can be as follows: 6 seconds, 5.5 seconds, 5 seconds, 4.5 seconds, 3 seconds, and finally 2.5 seconds.

Different compensation techniques may be used, depending on different factors. Such factors could include date, time of day, current battery capacity, one or more conditions indicative of the unsuccessful data exchange 460 triggering the compensation, a measurement of power used during the unsuccessful data exchanges 460, etc. For example, a client that is not part of a sensor network 140 and fails to join in after capturing a beacon 410 may not need to compensate as much as a client that is on the sensor network 140 and experiences an unsuccessful data exchange. Therefore, different techniques can be used in the different scenarios. Enabling clients to execute various compensation techniques, which can have different compensatory effects on power levels, can help the client maintain a predictable battery life.

Figure 6:
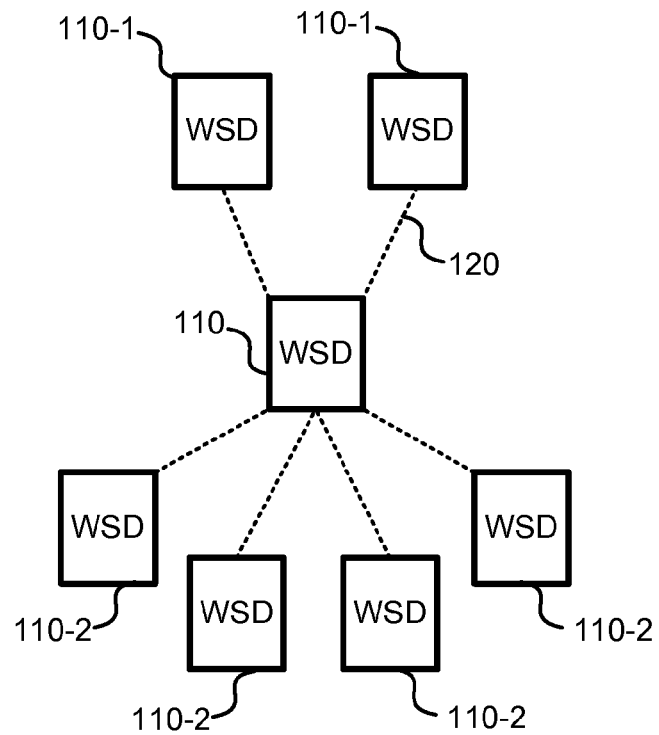
FIG. 6 is a simplified representation of wireless connections of WSDs in a sensor network, according to one embodiment.

FIG. 6 is an illustration of wireless connections 120 of a node in a sensor network 140. As indicated above, WSDs 110 and/or other nodes of the sensor network 140 can enable new WSDs 110 to join the sensor network 140 through beaconing and scanning functionality. Additionally, the WSDs 110 can operate to maintain the wireless connections 120 they have established with other WSDs 110, while taking various steps to reduce power consumption.

Depending on desired functionality, a WSD 110 can have up to a maximum number of wireless connections 120 with other WSDs 110. This number may be limited to help ensure a predictable, low-power profile. In one embodiment, the maximum number of connections is limited to 6. For instance, a WSD 110 can have a wireless connection with two parent WSDs 110-1, which can serve as primary and secondary parent WSDs 110-1. Here, "parent WSD" can be a server node through which the WSD 110, acting as a client node, joined the sensor network 140. More generally, "parent WSD" is an "upstream" node through which data from the WSD 110 (or any other "child" WSD 110-2) is relayed to get to the gateway 130. For WSDs 110 wirelessly connected directly with the gateway 130, the gateway 130 acts as a parent node. Additionally, WSDs 110 can act as a server to enable numerous child WSDs 110-2 to join the wireless network 140. Moreover, the techniques described herein apply to other types of network nodes besides WSDs 110, and to wireless networks other than sensor networks 140.

One technique by which a WSD 110 can save power is to control the amount of other WSDs 110 with which it is joined. For example, a WSD 110 may act as a server by periodically transmitting beacons 410, thereby enabling other WSDs 110 to join as child WSDs 110-2. However, once a WSD 110 is joined with a threshold number of child WSDs 110-2, the WSD 110 can limit its capacity to join with other child WSDs 110-2 by reducing its beacon transmitting activity. This, in turn, reduces both power consumption of the WSD 110 (increasing battery life) and contention (i.e., RF interference), while still enabling some WSDs 110 to join. (For example, an WSD 110 can continue to transmit beacons 410 to enable only certain WSDs 110 to join, such as "orphan" WSDs 110 that are not joined to any other WSDs 110.)

A WSD 110 can reduce its transmitting activity in various ways, similar to the techniques used for power compensation described above. For example, while a WSD 110 is in "saturation mode" (i.e., has a threshold number of child WSDs 110-2), it can reduce transmission activity by skipping beaconing sequences, shortening one or more beaconing sequences, increasing the intervals between beaconing sequences, etc.

Just as a WSD 110 can reduce beaconing activity when it has a threshold number of child WSDs 110-2, the WSD 110 can similarly reduce scanning activity when it has a threshold number of parent WSDs 110-1. For example, a WSD 110 can be configured to reduce scanning activity (using power compensation techniques described above) after it establishes primary and secondary parent WSDs 110-1, which can provide predictable power consumption. Thus, if a WSD 110 has N child WSDs 110-2 and M parent WSDs 110-1, the saturation can be measured proportional to the power consumption and compensated accordingly.

Figure 7:
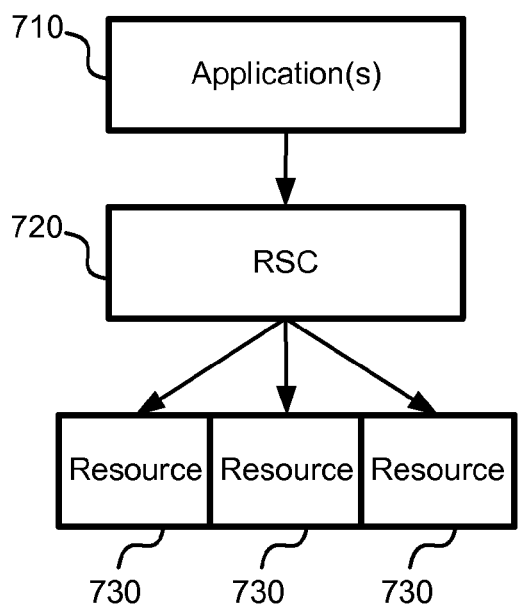
FIG. 7 is a block diagram of a resource sharing mechanism that can be implemented in a WSD.

FIG. 7 is a block diagram of a resource sharing mechanism that can be implemented in a WSD 110. A reservation scheduler (RSC) 720 can be a kernel component which does not replace any other functionality such as jobs or timers. The RSC 720 manages reservations from application(s) 710 among various resources 730 of the WSD 110 (such as the wireless interface 240, processing unit 210, etc.). Application programming interface (API) requirements for application(s) 710 can be designed based on the assumption that reservations or resources 730 are managed through the RSC 720. In other words, application requirements can restrict the application(s) 710 from trying to bypass the RSC 720 to access a resource 730 without being granted explicit access by the RSC 720.

The RSC 720 allows reserving a specified resource 730 at a specified time and/or for a specified duration of time. Upon requesting a reservation, the application(s) 710 receives a confirmation for the reservation, which can be considered a formal claim of access to a specified resource 730 at a given point in time for a specified period of time. The RSC 720 then de-conflicts pending reservations which overlap in time by granting resource access to only one reservation.

In such a configuration, application(s) 710 can use jobs and timers along with reservations. The RSC 720 can be used for allowing access to a resource on a long-term basis while jobs and timers are used within or outside reservations to run management tasks or feed the state machines of the application(s) 710. The RSC 720 additionally can use timers, which can allow the application(s) 710 to rely on the timing functionality of the RSC 720 without having to implement its own timers. In one embodiment, application(s) 710 may be able to cancel reservations made with the RSC 720 at any time.

Reservations can have priorities, thus allowing different applications having different priorities to access a resource. A reservation can be allowed (i.e., application(s) 710 is granted access to a resource 730) only when it does not overlap in time with nay other outstanding reservations of a higher priority. Moreover, reservations may not be preemptive. Thus, once started, a reservation can end as scheduled or when explicitly released by the application(s) 710. Reservations of the same priority can be treated on a first come, first serve basis, without taking into account their duration. Concerns that long-duration reservations of a lower priority may be routinely skipped and rescheduled can be addressed by increasing reservation priority and/or reducing the duration of the reservation (which may be extended with a reservation extension mechanism).

Information provided by the application(s) 710 to the RSC 720 to make a reservation can vary, depending on desired functionality. According to one embodiment, the application(s) 710 can provide a priority, type, time, duration, one-time extension, resource, state, callback, etc., relating with a reservation. Furthermore, according to one embodiment, the priority can include one of 256 different levels (e.g., 0 being the lowest priority, and 255 being the highest).

Figure 8:
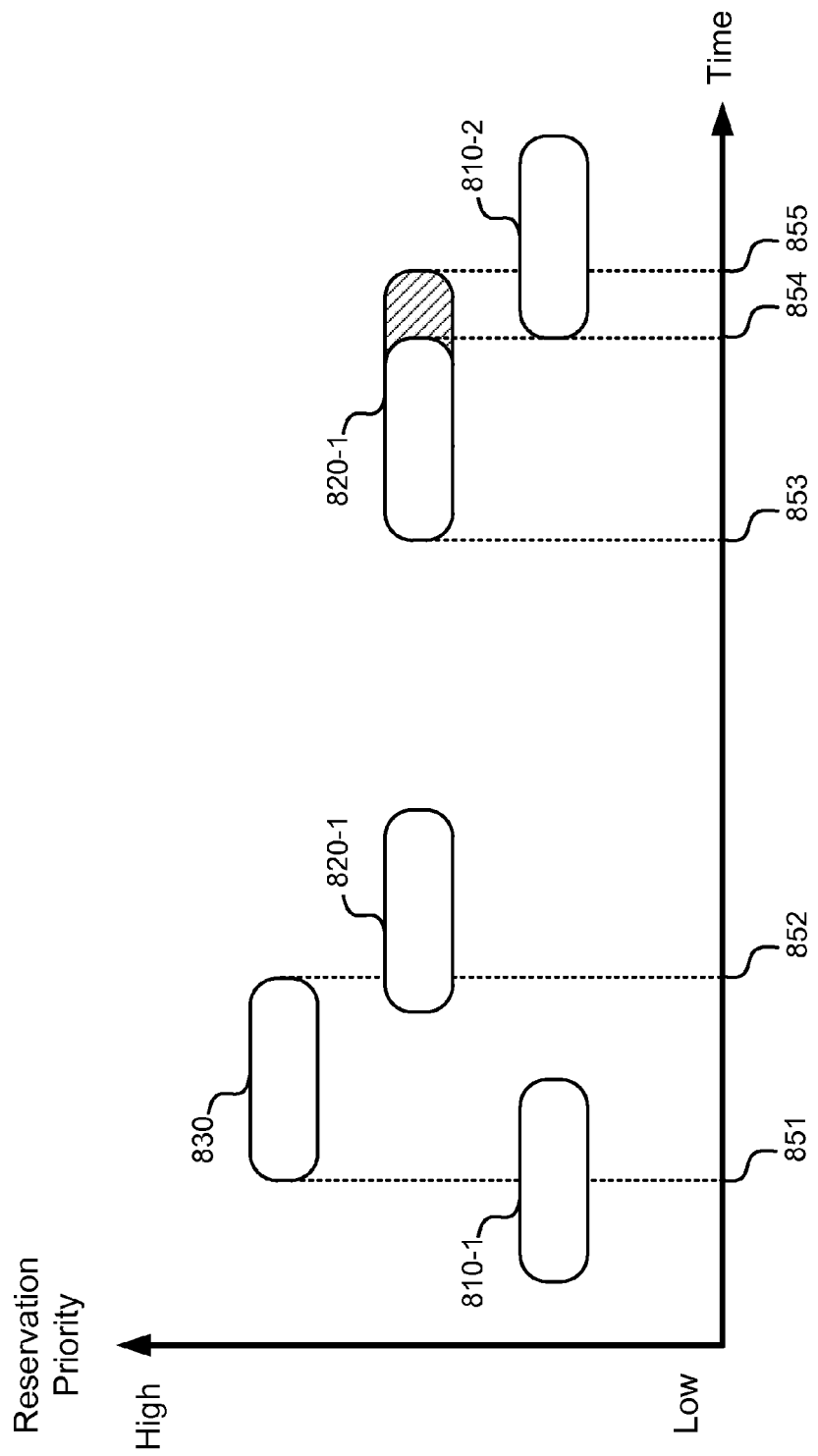
FIG. 8 is a timing diagram showing how the resource sharing mechanism of FIG. 7 can manage reservations of different priorities for a particular resource for a given period of time, according to one embodiment.

FIG. 8 is a diagram to help illustrate how the RSC 720 can manage reservations of different priorities for a particular resource 730 for a given period of time. The diagram includes one high-priority reservation 830, two medium-priority reservations 820, and two low-priority reservations 810. The features shown in FIG. 8 are provided as an example. In practice, there can be far more features for a given amount of time, such as additional levels of priorities for reservations, among other things.

The RSC 720 can allow reservations requests for any current and/or future time. The duration of the reservation can vary, depending on the functionality of the WSD 110 (e.g., as short as one system clock to as long as a maximum allowed value.) The application(s) 710 can make a reservation lasting for a certain period of time—preferably as long or slightly longer than it would take to complete the associated task. The application(s) 710 can release the reservation before the scheduled ending time of the reservation if there is no more need for a resource 730.

For example, in FIG. 8, the RSC 730 can skip low-priority reservation 810-1 because it would overlap with high-priority reservation 830, which has a starting time 851 that would occur in the middle of the low-priority reservation 810-1. Similarly, RSC 730 would skip medium-priority reservation 820-1 if the high-priority reservation 830 is not complete until its scheduled end time 852.

If there may be a chance that application(s) 710 releases a higher-priority reservation before its scheduled end time, the RSC 730 may not skip a lower-priority reservation until the start time for the lower-priority reservation has lapsed. For example, a medium-priority reservation 820-1 that begins at a start time 853 and does not have a scheduled end time 855 until after the scheduled start time 854 of a low-priority reservation 810-2 may be released before the start time 854 of a low-priority reservation 854. This would allow the RSC 730 to grant permission to access the resource to the application(s) 710 that made the low-priority reservation 810-2.

Another technique that can help reduce the power consumed by WSDs 110 in a wireless sensor network 140 is to provide automatic slowdown load balancing. Such a technique includes controlling the slowdown for each wireless connection 120 an individual WSD 110 based on the amount of information, or "traffic," the WSD 110 has to relay. This slowdown ultimately can reduce power consumption when traffic is light.

Figure 9A:
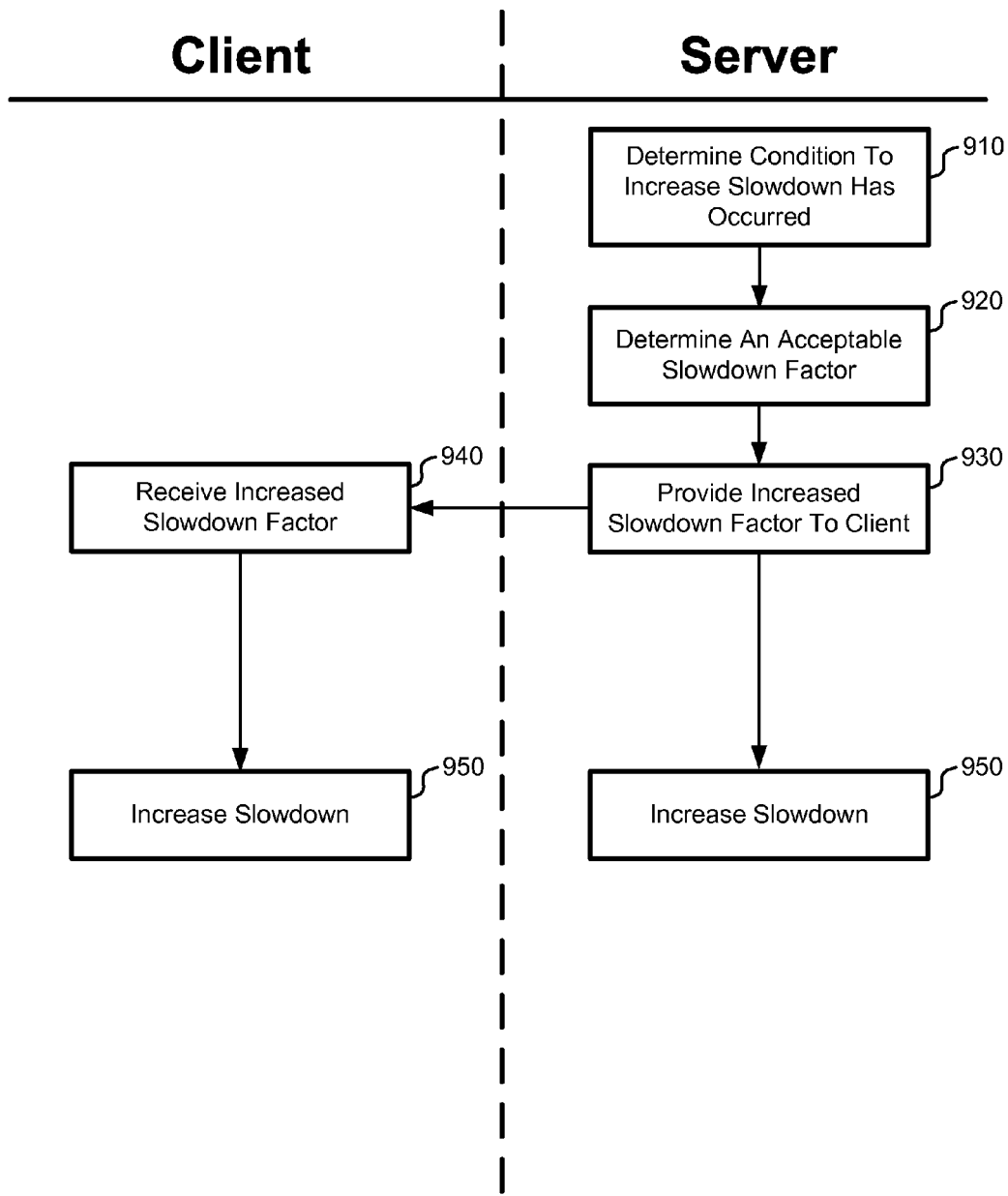
FIG. 9A is a simplified swim-lane diagram illustrating one embodiment of a method for automatically increasing slow-down between a client node and a server node.

FIG. 9A is a simplified swim-lane diagram illustrating one embodiment of a method for providing automatic slowdown load balancing between two WSDs 110 communicatively connected by a wireless connection 120: one WSD 110 acting as a server, and the other acting as a client. The method illustrated in the diagram could be performed at various times, such as during joining of the client to the wireless sensor network 140 and/or during the scheduled communication link maintenance. This diagram is provided as an example and is not limiting. For example, additional blocks may be added, blocks may be combined, split, and/or rearranged without straying from the spirit or scope of the disclosed method.

The term "slowdown," as used herein can indicate an operating speed of a WSD 110, the slowdown being inversely proportional to the operating speed of a particular wireless connection 120. An increase in slowdown is therefore a decrease in operating speed. Likewise, a decrease in slowdown corresponds with an increase in operating speed.

At block 910, the server determines that a condition to increase slowdown has occurred. Conditions could include any number of criteria. For example, the server may determine that it a slowdown is necessary if the server receives less than $N_{min}$ packets from the client within a period of time M, where $N_{min}$ is a number and M is a predetermined length of time, either of which may be automatically determined, or set by a user. Depending on desired functionality, $N_{min}$ may be set to 0. In a second example, the server may determine that it a slowdown is necessary if it receives less than $N_{min}$ packets within M time slots. $N_{min}$ and M can be numbers, and again, $N_{min}$ may be set to 0 depending on desired functionality.

At block 920, the server determines an acceptable slowdown factor. The slowdown factor can be an indicator, such as a numerical value, that describes a decreased communication schedule and/or clock speed. Depending on the circumstances, a server may determine that any of a number of slowdown factors may be used, and the server can be configured to select a particular slowdown factor based on a desired functionality. For example, it may pick the slowdown factor what would increase the slowdown of the communication link between the client and server the most. The server later can determine if the slowdown should be decreased to communicate information packets adequately.

At block 930, the server provides the slowdown factor to the client, and the slowdown factor is received by the client at block 940. At blocks 950, both server and client increase the slowdown accordingly. This method of slowdown control can help improve power consumption for both server and client and decrease contention (e.g., RF interference), although it may increase latency of single information packets. It further enables each WSD 110 to manage power consumption related to each wireless connection 120 separately, rather than creating a fixed slowdown speed for the entire WSD 110.

Figure 9B:
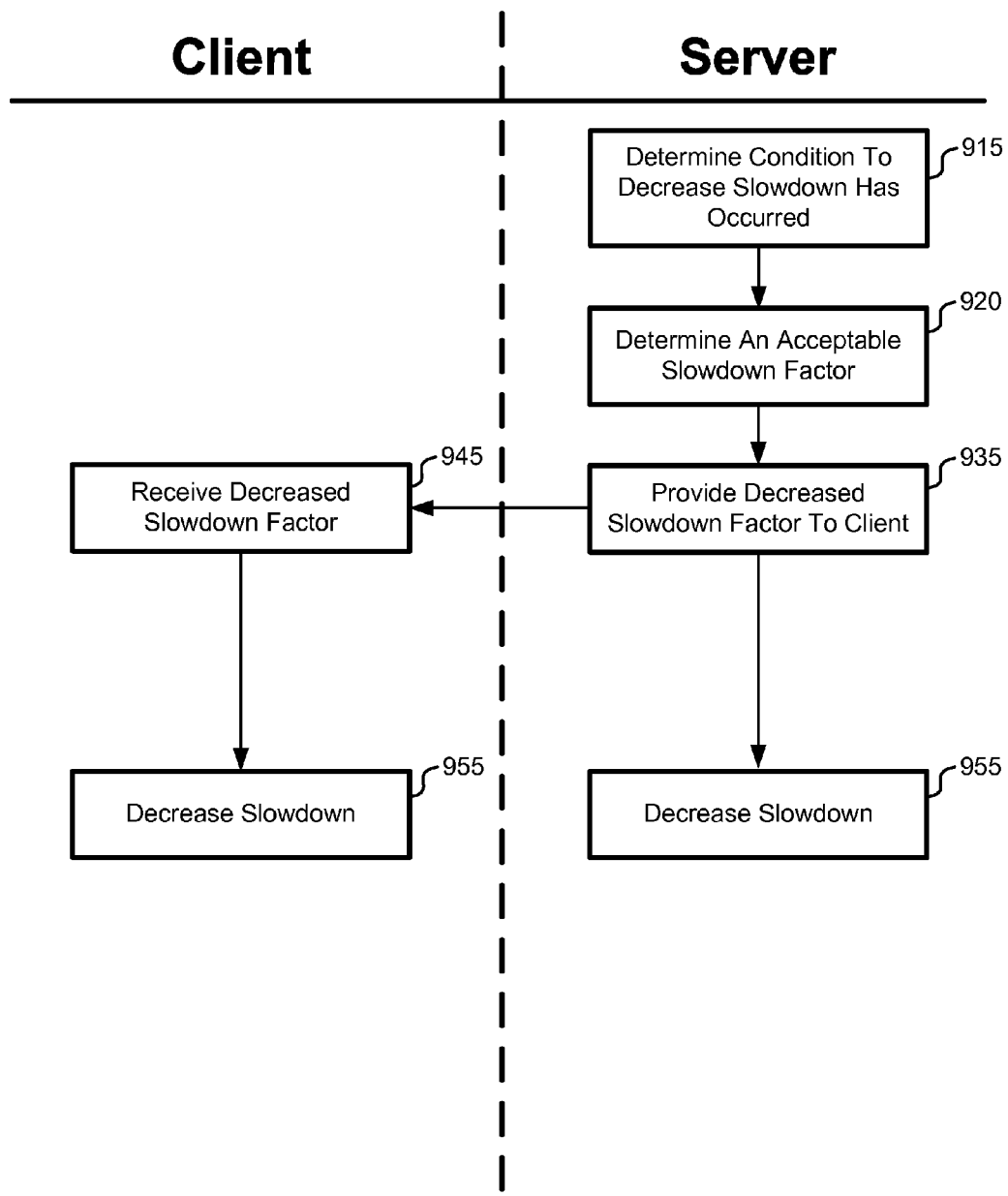
FIG. 9B is a simplified swim-lane diagram illustrating one embodiment of a method for automatically decreasing slow-down between a client node and a server node.

FIG. 9B a is a simplified swim-lane diagram illustrating another embodiment of a method for providing automatic slowdown load balancing between two WSDs 110. The method is similar to the one shown in FIG. 9A, except that it ultimately decreases slowdown at blocks 955, essentially increasing the throughput of potential communication between the server and client.

At block 915, the server in the method of FIG. 9B the server determines a condition to decrease slowdown has occurred. Similar to the conditions to increase slowdown, the conditions to decrease slowdown can include a variety of criteria. For example, the server may determine that a decrease in slowdown is necessary if the server receives more than $N_{max}$ packets from the client within a period of time M, where $N_{max}$ is a number and M is a predetermined length of time, either of which may be automatically determined, or set by a user. Depending on desired functionality, $N_{max}$ may be set to 0. In a second example, the server may determine that a decrease in slowdown is necessary if it receives more than $N_{max}$ packets within M time slots. N and M are numbers, and again, N may be set to 0 depending on desired functionality.

The $N_{min}$ used to determine an increase in slowdown and the $N_{max}$ used to determine a decrease in slowdown can be different. This can enable the server to operate at a certain slowdown speed while the connection between client and server performs within these maximum and minimum values. Moreover, $N_{min}$ and $N_{max}$ can be different for each slowdown speed, enabling the client and server to operate at any of a variety of slowdown speeds.

Yet another technique that can help reduce the power consumed by WSDs 110 in a wireless sensor network 140 is to manage output transmit power (TX power) of the WSDs 110. During scheduled communication, each WSD 110 can measure the Link Quality Indication (LQI) and Received Signal Strength Indication (RSSI) of received packets. Additionally, each WSD 110 can report last LQI and RSSI measured. Thus, each WSD 110 can determine the quality of the wireless connection 120 it has with all other WSDs 110 to which it is connected.

Figure 10:
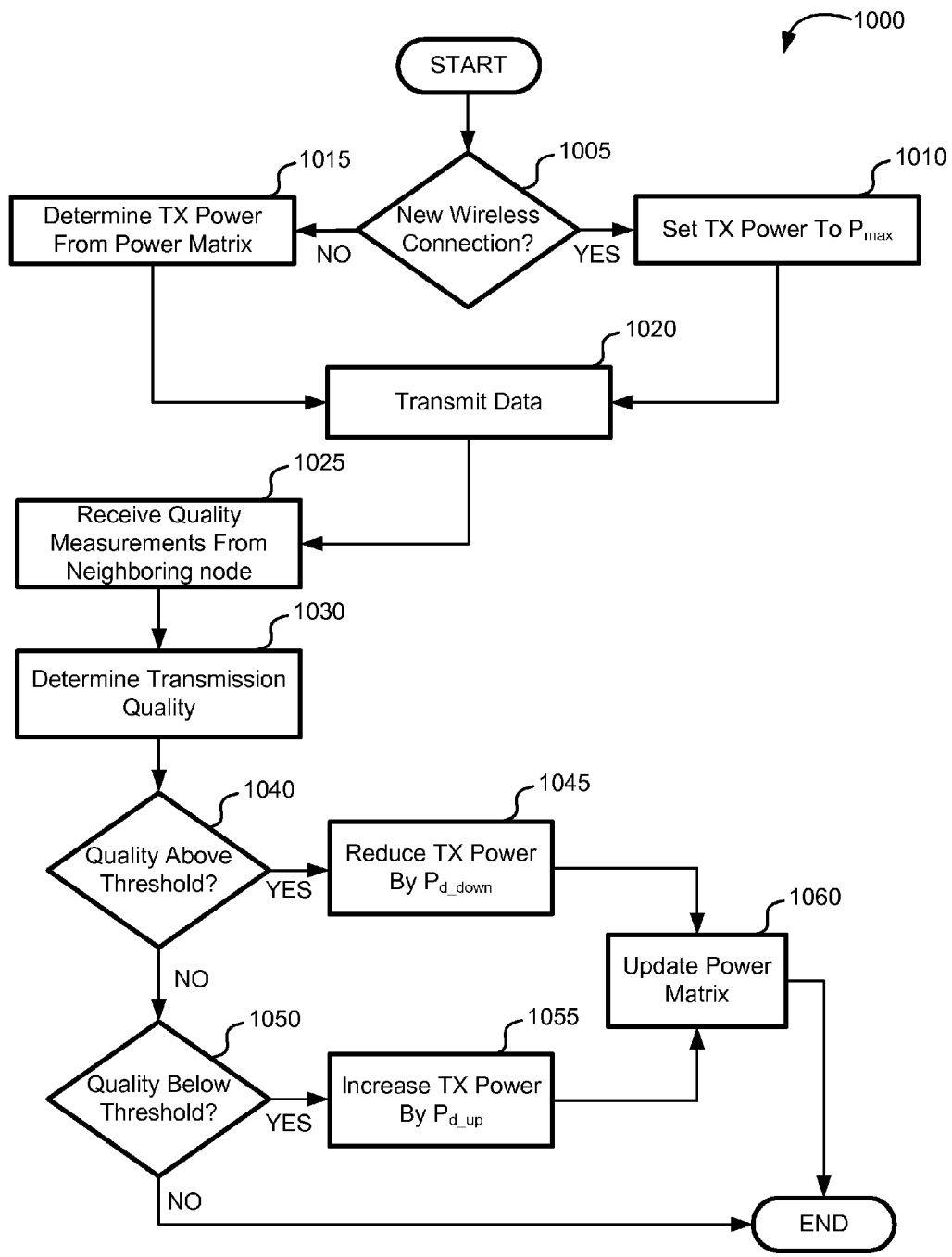
FIG. 10 is a block diagram of a method of using quality measurements received by a WSD as criteria for optimizing TX (transmit) power, according to one embodiment.

FIG. 10 illustrates a method 1000 of using quality measurements, such as LQI and RSSI, received by a WSD 110 as criteria for optimizing TX power for each wireless connection 120, according to one embodiment. The transmission quality (TX quality) of each wireless connection 120 of a WSD 110 can vary substantially depending on various factors such as distance, RF interference, physical obstacles, and more. Each wireless connection 120 of a WSD 110 therefore may require a different amount of TX power to ensure the TX quality remains above a certain threshold. The WSD 110 correspondingly can execute the method 1000 for optimizing TX power for each wireless connection 120.

For WSDs 110 that can communicate using multiple RF channels, WSD 110 additionally can execute method 1000 for each channel. Optimal TX power can vary for each channel, even for the same wireless connection 120, due to factors such as RF interference. Ultimately, WSDs 110 executing such a method 1000 for each wireless connection 120 and each RF channel, the increase the efficiency of the wireless sensor network 140 by reducing power consumption without sacrificing TX quality. As with other methods discussed herein, although described in the context of WSDs 110 in a wireless sensor network 140, the method can apply broadly to virtually any type of node on a variety of different types of wireless networks.

The method 1000, which can be executed by a WSD 110, begins by determining whether a wireless connection between the WSD 110 and a neighboring node is new, at block 1005. (Here, a neighboring node can be another WSD 110, gateway 130, or other network device.) If so, at block 1010, the WSD 110 sets TX power at a maximum power, $P_{max}$, to help ensure the initial TX quality is satisfactory (e.g., LQI, RSSI, and/or any other quality measurements exceed a minimum threshold level of quality). If the wireless connection is not new, the WSD 110 determines an appropriate TX power from a power matrix stored on the WSD 110, at block 1015.

Figure 11:
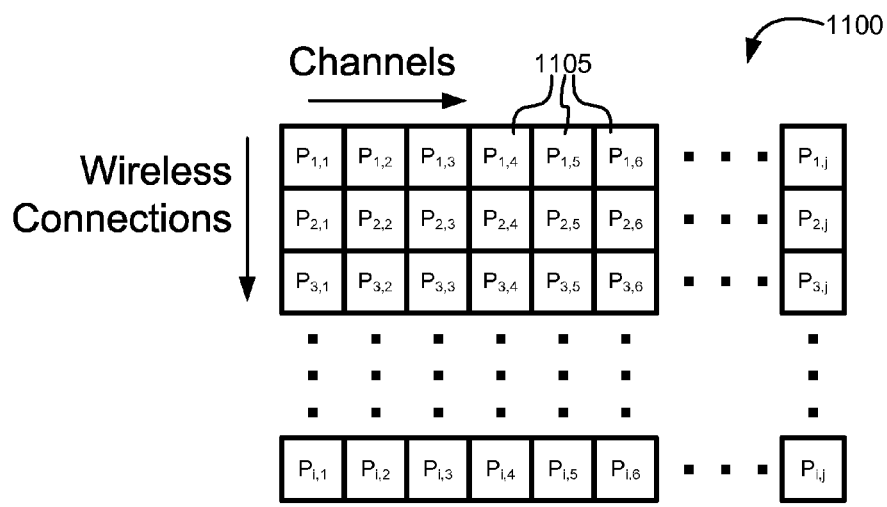
FIG. 11 is a simplified illustration of a power matrix that could be used by a WSD to track and determine optimal power levels for each channel on each wireless connection.

FIG. 11 shows a power matrix 1100 that could be used by a WSD 110 to track and determine optimal power levels for each channel on each wireless connection 120. The power matrix 1100 can be stored on memory 220 of the WSD 110 using any of a variety of software storage techniques (arrays, pointers, etc.), which can depend the software 225 executed by the WSD 110. The power matrix 1100 comprises a number of cells 1105, each of which can contain an optimal TX power value for a certain channel of a particular wireless connection 120.

The dimensions of the power matrix 1100 will depend on the number of possible wireless connections, i, and the number of possible channels, j. For example, a WSD 110 configured to have up to 5 wireless connections 120 and communicate on up to 16 channels can have a 5×16 power matrix with optimal TX power values for each channel of each wireless connection 120.

Referring again to FIG. 10, once the WSD 110 determines a proper TX power level for a wireless connection 120 at a given channel, it transmits data, at block 1020. The neighboring node receives the data, takes quality measurements (e.g., LQI and RSSI) of the corresponding transmission, and provides the measurements to the WSD 110, at block 1025. With these measurements, the WSD 110 then determines an associated TX quality, at block 1030.

The determination of TX quality can be conducted in various ways. It can be, for example, derived from a formula that takes into account both the LQI and the RSSI. In other embodiments, the WSD 110 simply may use the LQI and/or RSSI measurements themselves as a determination of TX quality. In either embodiment, the WSD 110 uses the quality determination (e.g., a derived value and/or raw measurements), to determine the TX quality in relation to one or more threshold values.

At blocks 1040 and 1050, the WSD 110 determines whether the TX quality is above a threshold value or below a threshold value, respectively. If the TX quality is above a threshold, at block 1045, the WSD 110 can reduce the TX power by a value $P_{d\_down}$. Alternatively, if the TX quality is below a threshold, at block 1055, the WSD 110 can increase the TX power by the incremental value $P_{d\_up}$. For example, in an embodiment that uses LQI and RSSI measurements provided by the neighboring node to determine TX quality, if both LQI and RSSI exceed a certain quality threshold, the WSD 110 reduces its TX power. On the other hand, if one or both measurements fall below a certain threshold, the WSD 110 increases its TX power.

The values of $P_{d\_up}$ and $P_{d\_down}$ can be different, depending on desired functionality. For example, a value $P_{d\_down}$ used to decrement the TX power may be smaller than a value $P_{d\_up}$ used to increment the TX power. This can help reducing the TX power by too much and avoid any difficulties that may ensue when trying to recover the connection quickly. In one embodiment, for example, a value for $P_{d\_down}$ is approximately 0.2 dBm, where a value for $P_{d\_up}$ used is approximately 1 dBm. That said, these values for may vary. For example, $P_{d\_down}$ may be smaller when TX power is relatively low, and larger when TX power is relatively high. Other variations are contemplated.

The threshold values for blocks 1040 and 1050 can be different. For example, the threshold in block 1040 can be a maximum threshold value, and the threshold in block 1050 can be a minimum threshold value. This creates a "window" in which the TX power can operate without making any adjustments, which can help prevent the WSD 110 from constantly changing TX power when quality is near a threshold value.

Figure 12:
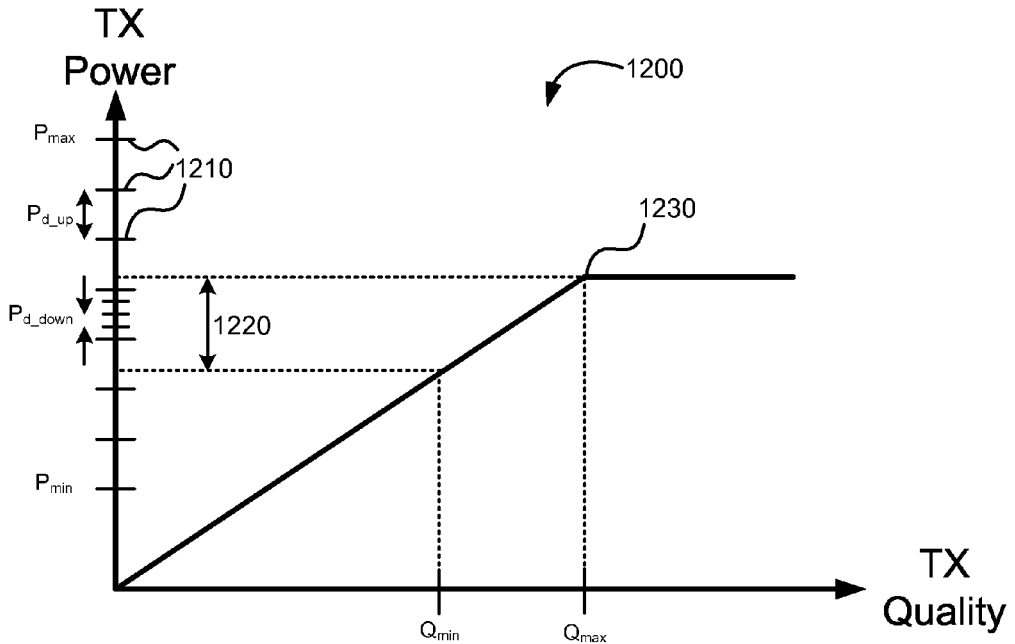
FIG. 12 is a simplified graph showing the relationship between TX power and TX quality.

FIG. 12 is a simplified graph 1200 showing the relationship between TX power and TX quality. The graph is provided for illustrative purposes and is not limiting. (For example, the relationship between TX power and TX quality may not be linear, as shown. Instead, it can vary substantially depending on various factors associated with the wireless connection 120.)

In general, TX power and TX quality are directly proportional: the TX quality increases with an increase in TX power. The WSD 110 may be able to operate at any of a number of discrete power values 1210 within a maximum power, $P_{max}$, and a minimum power, $P_{min}$, where $P_{d\_up}$ and $P_{d\_down}$ are incremental value between the discrete power values 1210. Additionally, a maximum threshold value, $Q_{max}$, and a minimum threshold value, $Q_{min}$, can be defined for TX quality, providing a corresponding window 1220 of TX power values in which the WSD 110 can operate. As shown in the graph 1200, $Q_{max}$ may be located at or near a point 1230 where the TX quality ceases to increase with increased TX power.

Referring again to FIG. 10, if the WSD 110 is operating at a TX power level within the window 1220 that results in TX quality that does not exceed or fall below threshold values, the method 1000 ends. Otherwise, if the TX power is changed, then at block 1060, WSD 110 can update the power matrix 1100 with the new TX power value for the corresponding wireless connection 120 and channel.

Figure 13:
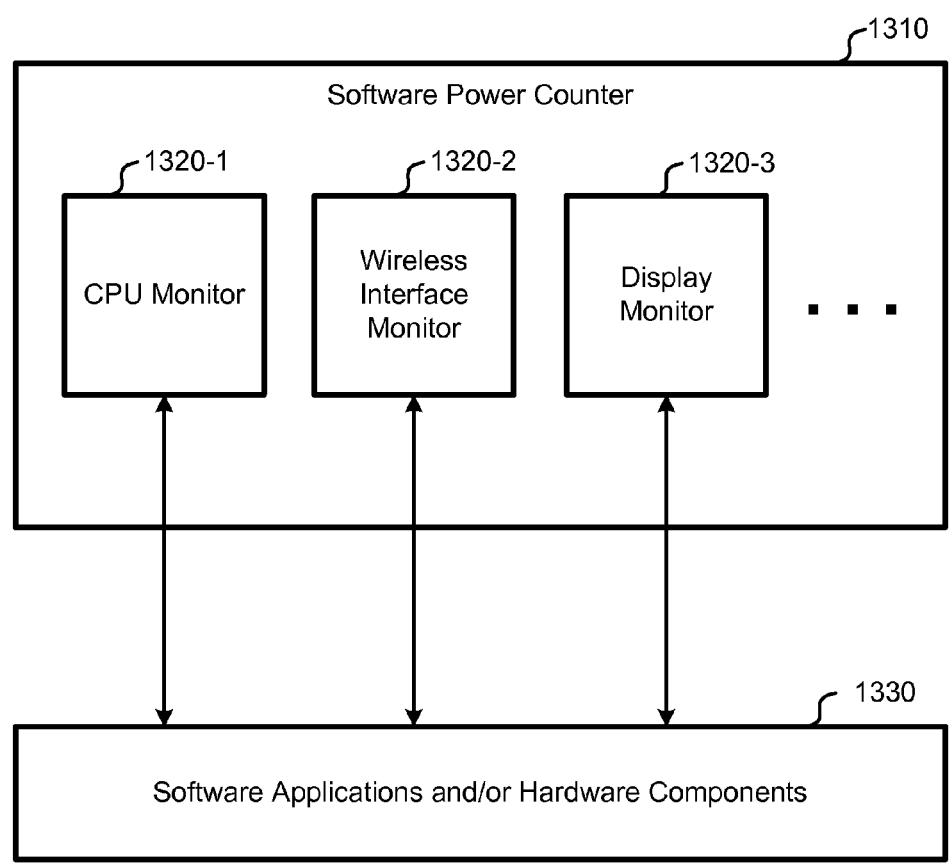
FIG. 13 is a block diagram of an embodiment of a software power counter for monitoring power consumption of a WSD.

Another technique that can help reduce the power consumed by WSDs 110 in a wireless sensor network 140 is to implement a software power counter that can monitor power consumption of various hardware components. FIG. 13 is a block diagram of an embodiment of such a software power counter 1310. The software power counter 1310 can include a number of monitors 1320, each of which can monitor a hardware component of the WSD 110. For example, as shown in FIG. 13, the software power counter can include a CPU monitor 1320-1, a wireless interface monitor 1320-2, a display monitor 1320-3, and more. The software power counter 1310 can be used in conjunction with, or as an alternative to, a hardware-implemented power monitoring system. Such systems perform "watchdog" functions to help ensure that, if there is any condition that causes the power consumption of a WSD 110 to exceed a certain threshold, the WSD 110 can be reset to exit the state of high power consumption. After being reset, the WSD 110 can automatically join the wireless sensor network 140 to restore the integrity of the network.

According to one embodiment, monitors 1320 of the software power counter 1310 each can accumulate the total time in which the corresponding hardware component is powered on. To do so, each monitor 1320 is communicatively connected with software applications and/or hardware components 1330 such that the monitors 1320 can determine the power state of the hardware components. For example, in addition or as an alternative to being communicatively connected with the hardware components, monitors 1320 can monitor functions of software applications that would turn on a hardware component and accumulate the total time the hardware component is powered on by counting the time until a software application executes another function that would turn off the hardware component. The software power counter 1310 then can determine overall power consumption of the WSD 110 by adding together power information from all the monitors. For example, the software power counter 1310 can calculate the power used by the wireless interface 120 by multiplying the time indicated by the wireless interface monitor 1320-2, which monitors the wireless interface 120, with a known constant or average current and/or power drawn by the wireless interface 120. According to different embodiments, the software power counter can be configured to reset the WSD 110 if power consumption exceeds 0.5 milliwatts (mW), 0.6 mW, 0.7 mW, 0.8 mW, 0.9 mW, 1.0 mW, 1.1 mW, 1.1 mW, 1.2 mW, 1.3 mW, 1.4 mW, 1.5 mW, 2 mW, etc.

Figure 14:
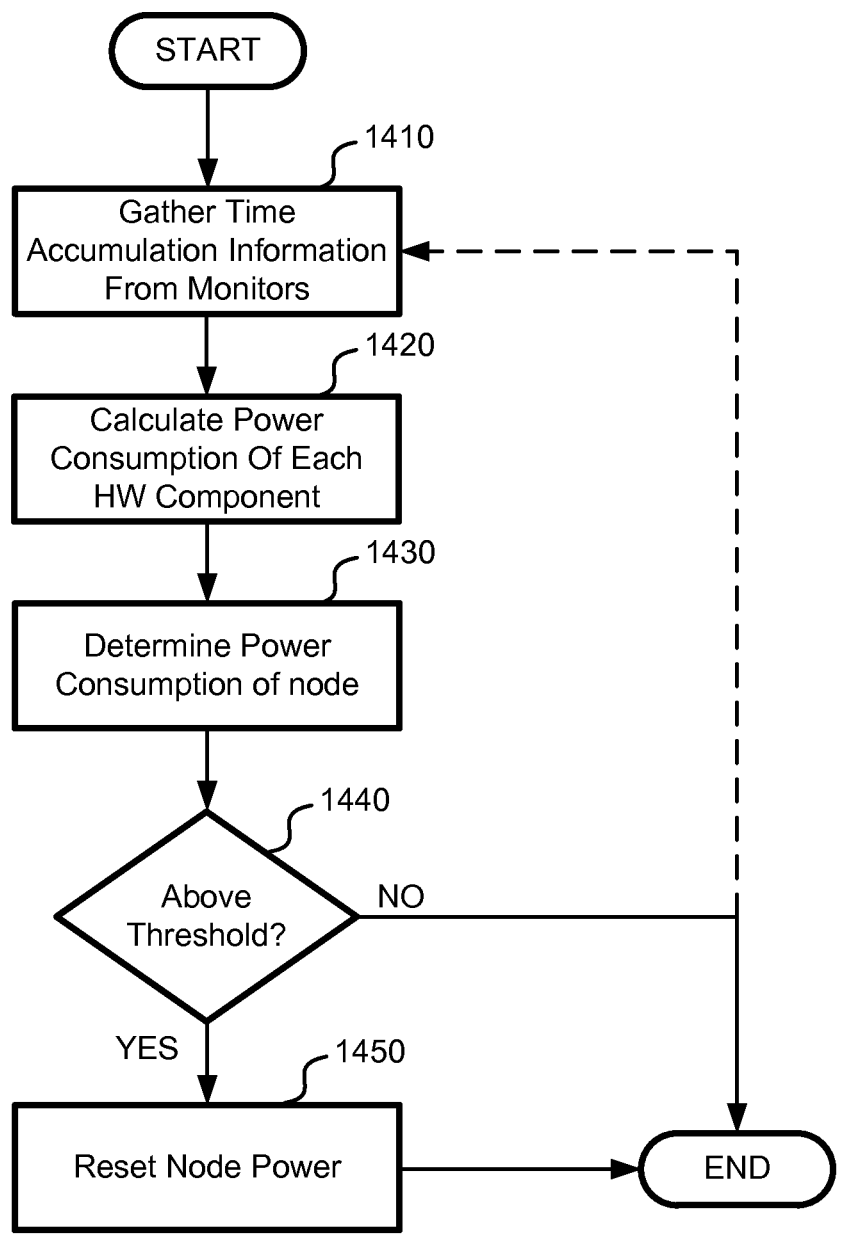
FIG. 14 is a flow diagram of a method for monitoring power usage of a WSD, according to one embodiment.

FIG. 14 illustrates a flow diagram of a method for monitoring power usage of a WSD 110. Such a method could be executed by a software power counter 1310 or other software and/or hardware power monitor. This flow diagram is an example and is not limiting. For example, additional blocks may be added, blocks may be combined, split, and/or rearranged without straying from the spirit or scope of the disclosed method.

At block 1410, time accumulation information from monitors 1320 is gathered, and at block 1420, power consumption of each hardware (HW) component is calculated. In some embodiments, an alternative value indicative of power consumption, such as current, can be calculated. As indicated above, power consumption (or similar information) can be calculated from time values by multiplying times with a known constant or average current. At block 1430, overall power consumption of the WSD 110 is determined by combining the calculated power consumption of each subsystem.

At block 1440, it is determined whether the power consumption (or similar information) is above an allowable threshold. Depending on desired functionality and calculated information, this determination could be based on any of a variety of conditions. For example, the threshold could be exceeded if the power consumed over a given period of time exceeds a certain power limit. In another embodiment where current measurements are taken periodically, the threshold may be exceeded if a certain number of measurements within a given set of measurements exceed an allowable limit.

The determination of whether the power consumption is above an allowable threshold determines how the method proceeds. For example, if the threshold is not exceeded, the method simply may end. In such a case, the method would be repeated periodically to ensure adequate power monitoring. Alternatively, depending on desired functionality, the method may return to block 1410 to gather more information and continuously monitor the power consumption of the WSD 110. On the other hand, if the power consumption threshold is exceeded, the method proceeds to block 1450, where the WSD 110 power is reset. Because the WSD 110 is configured to automatically rejoin any network it was previously connected with, resetting the WSD's power serves to pull the WSD 110 out of the state of high-power consumption while enabling the WSD 110—and the network—to automatically recover any wireless connections 120 that may have been lost in the process.

Although embodiments herein frequently are disclosed in the context of sensor networks 140, they are not limited to sensor networks, nor are they limited to transportation or logistical applications. Methods and devices disclosed herein can apply to wireless networks communicating information other than sensor information, such as identification, time, security, and/or location information. Indeed, any number of wireless networks can utilize the features disclosed herein for lower power consumption, predictable and consistent power consumption, and other benefits. Similarly, the techniques described herein pertaining to WSDs 110 can be applied more broadly to network devices in general. These more general network devices, for example, may not gather or transmit sensor data.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-readable instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the disclosed systems, methods, and devices have been described in detail herein, it is to be understood that the inventive concepts may be otherwise variously embodied and employed, and that the appended claims are intended to be construed to include such variations, except as limited by the prior art.

What is claimed is:

1. A network device for communicating with a low-power wireless network, the network device comprising:
   a battery;
   a wireless interface; and
   a processing unit coupled with the battery and the wireless interface, wherein the processing unit configured to cause the network device to:
   detect, using the wireless interface, a packet of information from the low-power wireless network, wherein the detection occurs while the network device is operating in a first mode;

operate in a second mode, wherein:
    the network device uses less power while operating in the second mode than while operating in the first mode, and
    operating in the second mode is based, at least in part, on information of the packet of information;
    determine that a condition has occurred; and
    change a time in which the network device operates in the second mode, wherein the change is based, at least in part, on the determination that the condition has occurred.

2. The network device for communicating with the low-power wireless network recited in claim 1, wherein the condition includes either or both of:
    a failure of the network device to join the low-power wireless network; and
    a failure of the network device to communicate data to the low-power wireless network with an accuracy above a threshold level.

3. The network device for communicating with the low-power wireless network recited in claim 1, wherein increasing the time in which the network device operates in the second mode includes reducing a length of one or more time periods in which the network device operates in the first mode.

4. The network device for communicating with the low-power wireless network recited in claim 3, further including reducing a number of radio frequency (RF) channels scanned during each of one or more time periods in which the network device operates in the first mode.

5. The network device for communicating with the low-power wireless network recited in claim 1, wherein increasing the time in which the network device operates in the second mode includes increasing a length of each time period in a set of time periods in which the network device operates in the second mode.

6. The network device for communicating with the low-power wireless network recited in claim 5, wherein the length of each time period in the set of time periods is successively reduced.

7. The network device for communicating with the low-power wireless network recited in claim 1, wherein the time in which the network device operates in the second mode is increased by operating in the second mode during one or more time periods in which the network device would otherwise operate in the first mode.

8. The network device for communicating with the low-power wireless network recited in claim 1, further comprising at least one sensor communicatively coupled with the processing unit.

9. The network device for communicating with the low-power wireless network recited in claim 1, wherein the processing unit is further configured to cause the network device to send data, including a request to join the low-power wireless network, toward the low-power wireless network.

10. The network device for communicating with the low-power wireless network recited in claim 1, wherein the processing unit is further configured to determine that the condition has occurred using at least one factor selected from the group of factors consisting of:
    a failure of an error control check,
    receipt of a packet of information indicating the network device has not joined the low-power wireless network,
    an inability of the network device to decrypt a packet,
    an inability of the network device to authenticate a packet, and
    a failure to receive a packet of information from the low-power wireless network.

11. A method of communication in a low-power wireless network, the method comprising:
    detecting, with a wireless network device, a packet of information from the low-power wireless network, wherein the detection occurs while the network device is operating in a first mode;
    operating the network device in a second mode, wherein:
        the network device uses less power while operating in the second mode than while operating in the first mode; and
        operating the network device in the second mode is based, at least in part, on information of the packet of information;
    determining that a condition has occurred; and
    changing a time in which the network device operates in the second mode, wherein the changing the time is based, at least in part, on the determination that the condition has occurred.

12. The method of communication in a low-power wireless network recited in claim 11, wherein the condition includes either or both of:
    a failure of the network device to join the low-power wireless network; and
    a failure of the network device to communicate data with the low-power wireless network with an accuracy above a threshold level.

13. The method of communication in a low-power wireless network recited in claim 11, wherein increasing the time in which the network device operates in the second mode includes reducing a length of one or more time periods in which the network device operates in the first mode.

14. The method of communication in a low-power wireless network recited in claim 13, further including reducing a number of radio frequency (RF) channels scanned during each of one or more time periods in which the network device operates in the first mode.

15. The method of communication in a low-power wireless network recited in claim 11, wherein increasing the time in which the network device operates in the second mode includes increasing a length of each time period in a set of time periods in which the network device operates in the second mode.

16. The method of communication in a low-power wireless network recited in claim 15, wherein the length of each time period in the set of time periods is successively reduced.

17. The method of communication in a low-power wireless network recited in claim 11, wherein increasing the time in which the network device operates in the second mode includes operating the network device in the second mode during one or more time periods in which the network device would otherwise operate in the first mode.

18. The method of communication in a low-power wireless network recited in claim 11, further comprising including sending a request to join the low-power wireless network.

19. The method of communication in a low-power wireless network recited in claim 11, further comprising determining that the condition has occurred using at least one factor selected from the group of factors consisting of:
    a failure of an error control check,
    receipt of a packet of information indicating the network device has not joined the low-power wireless network,
    an inability of the network device to decrypt a packet,
    an inability of the network device to authenticate a packet, and a failure to receive a packet of information from the low-power wireless network.

20. A network device configured to wirelessly communicate with a network, the network device comprising:
a wireless interface;
a power source; and
a processing unit coupled with the wireless interface and the power source, wherein the processing unit is configured to cause the network device to:
power on the wireless interface;
determine a condition has occurred, wherein the condition includes either or both of:
a failure of the network device to join the network; and
a failure of the network device to communicate data to the network with an accuracy above a threshold level; and
change, for a certain period of time after determining the condition has occurred, an amount of time the wireless interface is powered on.

* * * * *